O. SMITH.
GUARD OR SAFETY DEVICE FOR MACHINERY.
APPLICATION FILED MAR. 28, 1916.

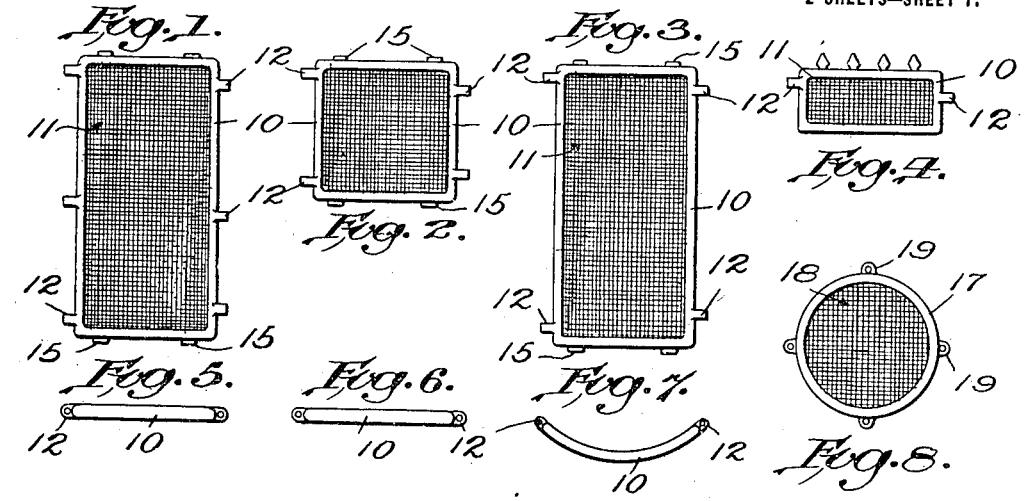
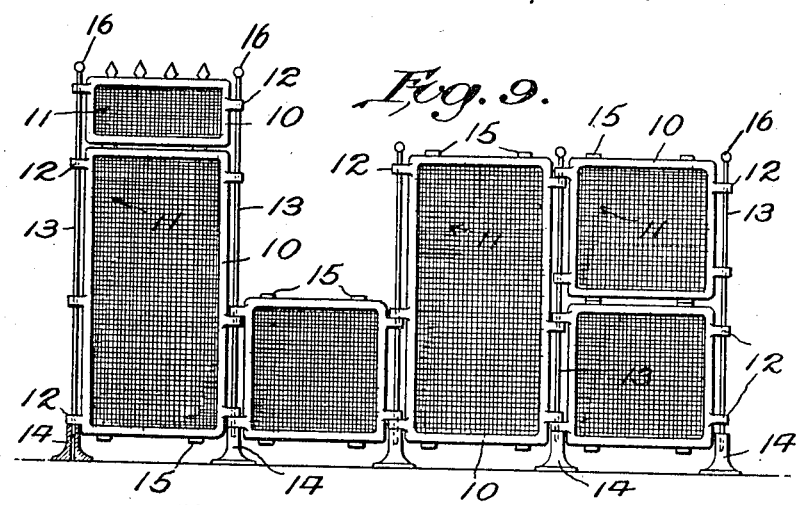
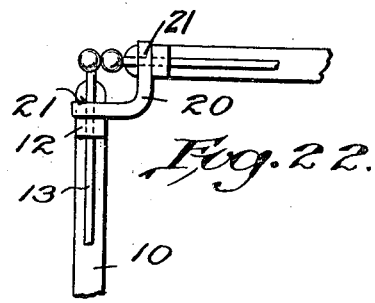
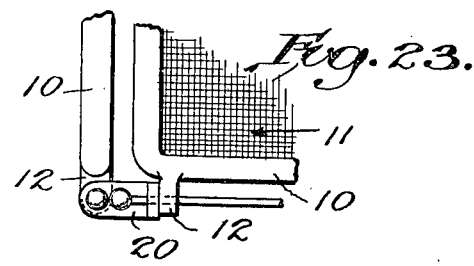
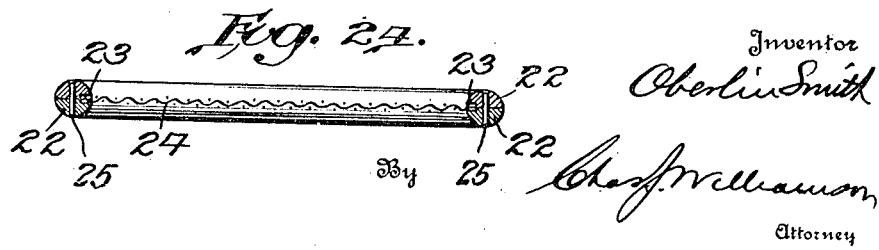

1,256,179.

Patented Feb. 12, 1918.
2 SHEETS—SHEET 2.

Inventor
Oberlin Smith
By Chas. J. Williamson
Attorney

UNITED STATES PATENT OFFICE.

OBERLIN SMITH, OF BRIDGETON, NEW JERSEY.

GUARD OR SAFETY DEVICE FOR MACHINERY.

1,256,179.

Specification of Letters Patent.

Patented Feb. 12, 1918.

Application filed March 28, 1916. Serial No. 87,293.

*To all whom it may concern:*

Be it known that I, OBERLIN SMITH, a citizen of the United States, and resident of Bridgeton, in the county of Cumberland, and in the State of New Jersey, have invented a certain new and useful Improvement in Guards or Safety Devices for Machinery, and do hereby declare that the following is a full, clear, and exact description thereof.

There is a demand for guards, or safety devices for the protection of workmen from injury from the parts of moving machines. Machines vary greatly in shape and size and location of their moving parts so that the provision of a guard for each individual machine, even in an ordinary plant, would be a costly matter. The object of my invention is to enable the provision of guards, or safety devices to meet all requirements as to size and individuality for each particular machine, and to enable this to be done inexpensively and efficiently, and incidentally to enable ready access to any desired part of the machine through the guard, and I achieve the object of my invention by the manufacture of units of a determined size and shape, each of which comprises a light open frame inclosing and supporting a perforated, or reticulated sheet, these units being capable of ready and easy assemblage, so as to inclose the machine by conforming to its particular shape, or contour and without the waste of room, or space about the machine.

I illustrate some embodiments of my invention in the accompanying drawings, in which—

Figures 1, 2, 3 and 4, respectively, are side views of units of different proportion and shape having the characteristics which are required in my invention;

Figs. 5, 6 and 7 are, respectively, top plan views of the units shown in Figs. 1, 2 and 3;

Fig. 8 is a top plan view of a lid, or cover member that may be used in the practice of my invention;

Fig. 9 is a side elevation showing an assemblage of units as they appear when in use;

Fig. 22 is a view in side elevation illustrating an assemblage of sections, or units so that they lie in planes at an angle to each other;

Fig. 23 is a top plan view thereof;

Fig. 24 is a horizontal section through one of the units in which the frame and guard member are united otherwise than by casting the frame about the guard member.

Figure 10:
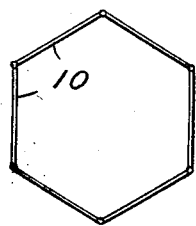
Figs. 10, 11, 12, 13, 14, 15, 16, 17, 18, 19, 20 and 21 are top plan views, diagrammatic in form, showing some of the great variety of shapes and proportions of guards, or safety devices that may be built up with units that have the simple rectangular, flat and the curvilinear form shown in Figs. 1 to 3.

As has already been indicated, each unit consists of a frame 10, which in side elevation is substantially rectangular, and an open work sheet 11, preferably of wire cloth, attached at its edges to the sides of the frame, and as preferably constructed, the frame 10 is of cast metal with the edges of the sheet 11 cast therein, the sheet being inserted in the parting of the two mold flasks in which the frame is cast so that its edges will be embodied therein, and a secure connection formed which avoids the existence of any rough, or raw edges on the sheet, and thus provides a smooth, neat looking structure at very low cost. On each side bar of the frame 10 there are several, preferably two, horizontally projecting ears, or lugs 12, the lugs of one side being out of alinement with the lugs at the opposite side by the distance equal to the thickness of the lugs vertically so that when two units are placed alongside of each other their lugs will overlap and bring into coincidence the vertical holes therethrough for the passage of vertical round rods 13 for securing adjacent units together, whether those units be side by side or one above another. Preferably, the rods 13 at their lower ends enter vertical holes, or sockets in feet or floor pieces 14. It will be seen that the units, when assembled so as to surround, or partially surround the two, or more sides of a piece of machinery, will be self-supporting. On the top and bottom bars, or rails of each frame 10, there are, for example, two short lugs 15 to form small separated points of contact, or bearing surfaces between vertically adjacent units, both for the purpose of enhancing the appearance of the assembled units and to avoid possible trouble by reason of any irregularity of the top and bottom surfaces of the frame which might exist by reason of the horizontal extent thereof. As a matter of finish and for convenient handling, the rods 13 may have their upper ends provided with an ornamental head, or enlargement 16, which is cast on the rod. It will be seen that by the removal of a rod 13 a unit may be released and swung on its connection with the rod at its opposite side so as to open like a door, and thus give access to the mechanism adjacent thereto, and this can be done at any point in the assembly of units, and thus great freedom of access when desired at any particular part of the inclosed machine may be easily and quickly obtained and when the occasion for access has ceased, the units released can be instantly and readily secured together again by the replacement of the locking, or holding rod 13.

Figures 11, 12:
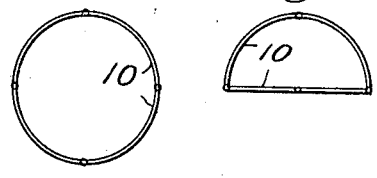
Figure 13:
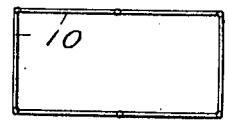
Figure 14:
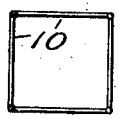
Figure 15:
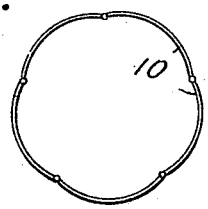
Figure 16:
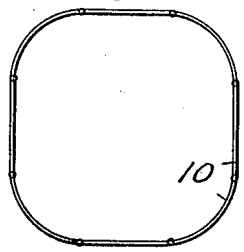
Figure 17:
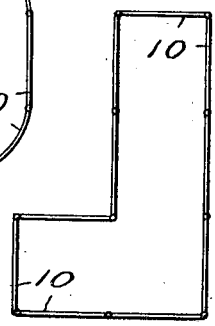
Figure 18:
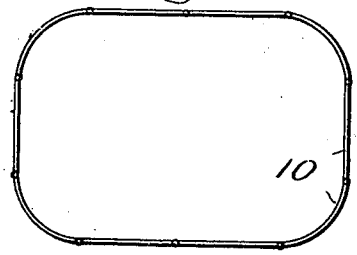
Figure 19:
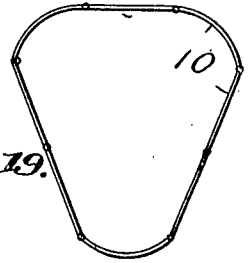
Figure 20:
Figure 21:
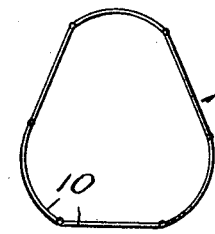

As shown in Figs. 1 to 4, a standard width of the various members, or sections there illustrated, is employed, they in that case being twelve inches from center to center of the holes of the ears 12, and while the units shown in said Figs. 1 to 4, vary in height, the larger ones are multiples of the small ones. The smallest in height shown in Fig. 4, may, for the purposes of finish at the top of the assembly, be given an ornamental form on its top bar. The forms shown in Figs. 1, 2 and 4, are flat, while that shown in Fig. 3 is curved on the arc of a circle, preferably an arc of ninety degrees between the centers of the lugs 12 and the distance between such centers on the chord is twelve inches, in the case shown, to conform with the standard width of the units, or sections shown in Figs. 1, 2 and 4. The great variety of forms, shapes and proportions that is possible with the simple plane and quarter circle units shown in Figs. 1 to 4, will be readily perceived, and some of the same are illustrated in Figs. 10 to 21, in some of which figures the plane forms alone are used; in others the curvilinear forms alone are used; and in still others both are used. When a cover, or lid is desired, as, for example, with the circular assembly shown in Fig. 11 such lid may have the construction illustrated in Fig. 8 where it consists of a cast metal circular frame 17 with a cast-in perforated sheet 18 and four equally distant lugs, or ears 19 for the passage of the attaching rods 13 by which the quarter circle units are held together.

If it is desired to assemble the sections, or units so that they lie in planes at an angle to each other, as for example, to have certain of them extending horizontally, as well as vertically, this may be done by the employment of the device shown in Figs. 22 and 23, which consists of an angle iron 20 in the form of a bent arm having near one extremity a hole 21 for the vertical rod 13, which passes through the vertical ears of the vertical section, and at or near its other extremity a similar eye or opening 21 for the passage horizontally of the rod 13 which also passes through the lugs 12 of the horizontally lying section, or unit. By placing the horizontal rod 13 in position first, and then dropping the vertical rod 13 into position, the latter will serve as a lock to prevent the accidental displacement by jars, or vibrations, or otherwise of the horizontal rod. The bent arm 20, instead of having the right angle shape shown in Figs. 22 and 23, may, of course, have other angles. As shown in Fig. 24 the frame 10 may be cast in matching halves 22 with adjacent recesses 23 at the inner sides of the frame to receive and grip the inserted edges of the wire cloth 24, the halves being secured together as by machine screws 25.

Having thus described my invention what I claim is—

1. As an improvement in guards or inclosures, an assembly of members composed each of a frame and an attached sheet of open work material, and having certain structural and dimensional characteristics in common, such common characteristics including elements for coöperating with connecting means on both sides of each member, and means coöperating with such elements for connecting them together.

2. As an improvement in guards or inclosures, an assembly of members composed each of a frame and an attached sheet of open work material, and having certain structural and dimensional characteristics in common, such common characteristics including elements for coöperating with connecting means on both sides of each member, and means coöperating with such elements for detachably connecting them together.

3. As an improvement in guards or inclosures, an assembly of members composed each of a frame and an attached sheet of open work material, and having certain structural and dimensional characteristics in common, such common characteristics including elements for coöperating with connecting means on both sides of each member, and means coöperating with such elements for connecting them together, the frame of each of said members being of cast metal, and the edges of the sheet being cast and embedded therein.

4. As an improvement in guards or inclosures, an assembly of members composed each of a frame and an attached sheet of open work material, and having certain structural and dimensional characteristics in common, such common characteristics including elements for coöperating with connecting means on both sides of each member, and means coöperating with such elements for connecting them together, certain of said members being plane and others being curvilinear.

5. As an improvement in guards or inclosures, an assembly of members composed each of a frame and an attached sheet of open work material, and having certain structural and dimensional characteristics in common, and means for connecting them together, certain of said members being plane and certain of said members being curvilinear, said connecting means consisting of perforated lugs on the sides of the frame, and rods passing through alining lugs of adjacent frames and the distance between the holes in lugs on opposite sides of the frame being the same for all the members.

6. As an improvement in guards or inclosures, an assembly of members composed each of a frame and an attached sheet of open work material, and having certain structural and dimensional characteristics in common, and means for connecting them together, comprising rod-receiving eyes on the frames, rods and an angle arm having holes to receive said rods.

In testimony that I claim the foregoing I have hereunto set my hand.

OBERLIN SMITH.

Copies of this patent may be obtained for five cents each, by addressing the "Commissioner of Patents, Washington, D. C."